United States Patent
Fromherz (10) Patent No.: US 8,005,561 B2
(45) Date of Patent: Aug. 23, 2011

(54) METHOD FOR SELF-SYNCHRONIZATION OF MODULAR PRODUCTION SYSTEMS

(75) Inventor: Markus P. J. Fromherz, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 248 days.

(21) Appl. No.: 12/372,534

(22) Filed: Feb. 17, 2009

(65) Prior Publication Data

US 2009/0149978 A1 Jun. 11, 2009

Related U.S. Application Data

(63) Continuation of application No. 10/811,676, filed on Mar. 29, 2004, now Pat. No. 7,512,455.

(51) Int. Cl.
G06F 19/00 (2011.01)
(52) U.S. Cl. .................. 700/100; 700/112; 700/228
(58) Field of Classification Search ............... 700/23, 700/100, 112, 113, 228, 229
See application file for complete search history.

(56) References Cited

U.S. PATENT DOCUMENTS

| | | | |
|---|---|---|---|
| 3,948,162 A | 4/1976 | Numba |
| 4,473,883 A | 9/1984 | Yoshida et al. |
| 4,548,394 A | 10/1985 | Koyama et al. |
| 4,699,367 A | 10/1987 | Russel |
| 4,783,678 A | 11/1988 | Honda et al. |
| 4,871,163 A | 10/1989 | Landa et al. |
| 5,020,789 A | 6/1991 | Droge et al. |
| 5,095,342 A | 3/1992 | Farrell et al. |
| 5,159,395 A | 10/1992 | Farrell et al. |
| 5,326,092 A | 7/1994 | Ando |
| 5,367,363 A | 11/1994 | Kai et al. |
| 5,557,367 A | 9/1996 | Yang et al. |
| 5,614,992 A | 3/1997 | Kikuchi et al. |
| 5,731,620 A | 3/1998 | Mori |
| 6,010,127 A | 1/2000 | DiCesare et al. |
| 6,095,043 A | 8/2000 | Hartmann et al. |
| 6,125,251 A | 9/2000 | Shiraishi et al. |
| 6,129,349 A | 10/2000 | Olbrich et al. |
| 6,139,011 A | 10/2000 | Huang et al. |
| 6,198,980 B1 | 3/2001 | Costanza |
| 6,592,121 B2 | 7/2003 | Frank et al. |
| 6,647,228 B2 | 11/2003 | Nakamura et al. |

(Continued)

FOREIGN PATENT DOCUMENTS

EP 0047056 A2 3/1982

(Continued)

OTHER PUBLICATIONS

EP 05251805.7, European Search Report, Jun. 11, 2007, 3 Pages.

(Continued)

*Primary Examiner* — Kakali Chaki
*Assistant Examiner* — Nate Laughlin
(74) *Attorney, Agent, or Firm* — Fay Sharpe LLP (57) ABSTRACT

A system and method for self-synchronization of modular production systems having components with various alternative capabilities for processing and transporting work units along transport highways, for various component/transport highway configurations. The method includes determining jobs of interest, with each job requiring the production of at least one work unit. The configuration of the components, including at least one machine module, and the transport highway is determined. Each component duration time is determined and a default self-synchronization time is identified. The default self-synchronization time is optimized by adjusting not less than one component duration time.

20 Claims, 5 Drawing Sheets

U.S. PATENT DOCUMENTS

| | | |
|---|---|---|
| 6,856,845 B2 | 2/2005 | Fromherz et al. |
| 6,895,292 B2 | 5/2005 | Fromherz et al. |
| 7,062,344 B2 | 6/2006 | Yokoyama et al. |
| 7,108,260 B2 | 9/2006 | Biegelsen et al. |
| 7,139,629 B2 | 11/2006 | Fromherz et al. |
| 7,185,888 B2 | 3/2007 | Duff et al. |
| 2001/0014246 A1 | 8/2001 | Luciano et al. |
| 2002/0183884 A1 | 12/2002 | Jones et al. |
| 2003/0045098 A1* | 3/2003 | Verhaverbeke et al. ...... 438/689 |
| 2004/0078109 A1* | 4/2004 | Babikian et al. .............. 700/121 |
| 2004/0086285 A1 | 5/2004 | Yoshikawa |
| 2005/0167903 A1 | 8/2005 | Hartl et al. |
| 2006/0071420 A1 | 4/2006 | Meier et al. |
| 2007/0029721 A1 | 2/2007 | Duff et al. |
| 2007/0296143 A1 | 12/2007 | Duff et al. |

FOREIGN PATENT DOCUMENTS

| | | |
|---|---|---|
| EP | 0633207 A1 | 1/1995 |
| EP | 1591395 A2 | 11/2005 |
| JP | 4-350041 | 12/1992 |
| JP | 05-057574 A | 3/1993 |
| WO | 00/28408 A2 | 5/2000 |

OTHER PUBLICATIONS

EP 05251806.5, European Search Report, Apr. 21, 2006, 3 Pages.
EP 0633207, Abstract (in English) for European Patent Application EP 0633207 (in German), Published Jan. 11, 1995, Micropatent's Patent Index Data Base, Printed Oct. 22, 2008, 4 Pages.
Patent Abstracts of Japan, English Translation of Japanese Pat. App. Publication No. 05-057574 (Published Mar. 9, 1993), Generated Using Japanese Patent Office Web Site Mar. 2, 2011, 12 Pages.

\* cited by examiner

METHOD FOR SELF-SYNCHRONIZATION OF MODULAR PRODUCTION SYSTEMS

CROSS REFERENCE TO RELATED APPLICATIONS

This patent application claims priority to and any benefit associated with co-pending U.S. patent application Ser. No. 10/811,676, filed Mar. 29, 2004, the contents of which are fully incorporated herein by reference.

The following co-pending applications, U.S. application Ser. No. 10/424,322, filed Apr. 28, 2003, titled "Monitoring and Reporting Incremental Job Status System and Method", U.S. application Ser. No. 10/424,620, filed Apr. 28, 2003, titled "Planning and Scheduling for Failure Recovery System and Method", U.S. application Ser. No. 10/424,661, filed Apr. 28, 2003, titled "Predictive and Preemptive Planning and Scheduling for Different Job Priorities System and Method", are assigned to the same assignee of the present application. The entire disclosures of these co-pending applications are totally incorporated herein by reference in their entirety.

INCORPORATION BY REFERENCE

The following U.S. patents are fully incorporated herein by reference: U.S. Pat. No. 6,095,043 to Hartmann et al. ("Device and Method for Driving a Printing Machine with Multiple Uncoupled Motors"); and U.S. Pat. No. 6,592,121 to Frank et al. ("Apparatus for Synchronizing Transfers of Sheet Material").

BACKGROUND

This disclosure relates generally to the control and management of automated production systems, and more particularly to applying self-synchronization for model-based planning and scheduling of modular production systems to improve productivity.

Modular production systems utilizing multiple components or resources to perform a task may be executing suboptimally if those components are not synchronized with respect to each other. An example is a printing system with a duplex loop, where the total loop time (from printing one page to printing the other page) should be an integral multiple of the time to print one image, which ensures that the full productivity of the printer is used. Traditionally, known configurations have been optimized "by hand" such that self-synchronization is assured, but new systems composed of modular components and multiple, cooperating resources require an automated method to achieve this self-synchronization.

In existing systems, self-synchronization is often achieved through analysis of a given, fixed system configuration and the tuning of system parameters (e.g., the dimensions or timing of its components). For example, for print production systems, manual or spreadsheet-based analysis would typically be used to determine the required dimensions and timing of components in order to achieve optimal productivity of the system. For print production systems, this analysis is typically restricted to a linear configuration of printers and their duplex loops. This can be seen in U.S. Pat. No. 6,095,043 to Hartmann et al., in which two printing units in a linear sequential configuration and a transfer unit are synchronized for paper movement, and in U.S. Pat. No. 6,592,121 to Frank et al., in which a transport system provides synchronization of a transport device conveying sheet material to insure collision-free transport. However, this art is directed to standard print system configurations and does not address the problems associated with systems having multiple operational modules.

In the printing domain, there are few products with tandem configurations (two or more tightly coupled printer modules) and even fewer with redundant paths between the main productivity-determining resources (printers), i.e., configurations are typically simple and easy to analyze. The state of the art in other domains, e.g., assembly lines, also often rely on manual fine-tuning for particular configurations (e.g., automotive production plants), or it is assumed that there are buffers between the production modules where parts can be stored, i.e., modules are only loosely coupled. While an alternative is not to optimize a configuration and live with sub-optimal productivity, this is often not an acceptable approach, since it may leave expensive equipment partly idle.

BRIEF SUMMARY

The disclosed embodiments provide examples of improved solutions to the problems noted in the above Background discussion and the art cited therein. There is shown in these examples an improved system and method for self-synchronization of modular production systems having components with various alternative capabilities for processing and transporting work units along transport highways, for various component/transport highway configurations, which may provide some or all of the following features. The method includes determining jobs of interest, with each job requiring the production of at least one work unit. The configuration of the components, including at least one machine module, and the transport highway is determined. Each component duration time is determined and a default self-synchronization time is identified. The default self-synchronization time is optimized by adjusting not less than one component duration time.

The system includes means for determining jobs of interest, with each job requiring the production of at least one work unit. The system configuration, including machine modules and transport highways, is identified, as are the durations of module actions. A default self-synchronization time is determined, and is then optimized by adjustment of at least one action duration time.

In another embodiment, there is provided an article of manufacture on a computer usable medium having computer readable program code embodied in the medium which causes the computer to perform method steps for self-synchronization of modular production systems having various components with a number of alternative capabilities for processing and transporting work units along transport highways. The configuration of the components, including at least one machine module, and the transport highway is determined. Each component duration time is determined and a default self-synchronization time is identified. The default self-synchronization time is optimized by adjusting not less than one component duration time.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Disclosed herein is a method and system that utilizes self-synchronization for model-based planning and scheduling of modular production systems. In such a system, the controller provides for continued use of all available system capabilities and reports system state as necessary after capabilities have been executed. To accomplish this, the method analyzes the available modules and, given desired tasks to be performed, determines actions and timing variables of selected modules such that the overall system performs optimally with respect to the jobs to be completed. This method may be combined with synchronizing single or multiple resources connected through loops or shared paths. In contrast to existing approaches to synchronization, which generally employ manual synchronization, the system and method described herein are made possible by utilizing up-to-date and real-time information of connected system modules and the requirements of jobs in process to enable automatic synchronization of the system modules and maximize productivity.

The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the present invention. It would be apparent, however, to one skilled in the art to practice the invention without such specific details. In other instances, specific implementation details have not been shown in detail in order not to unnecessarily obscure the present invention.

Figure 1:
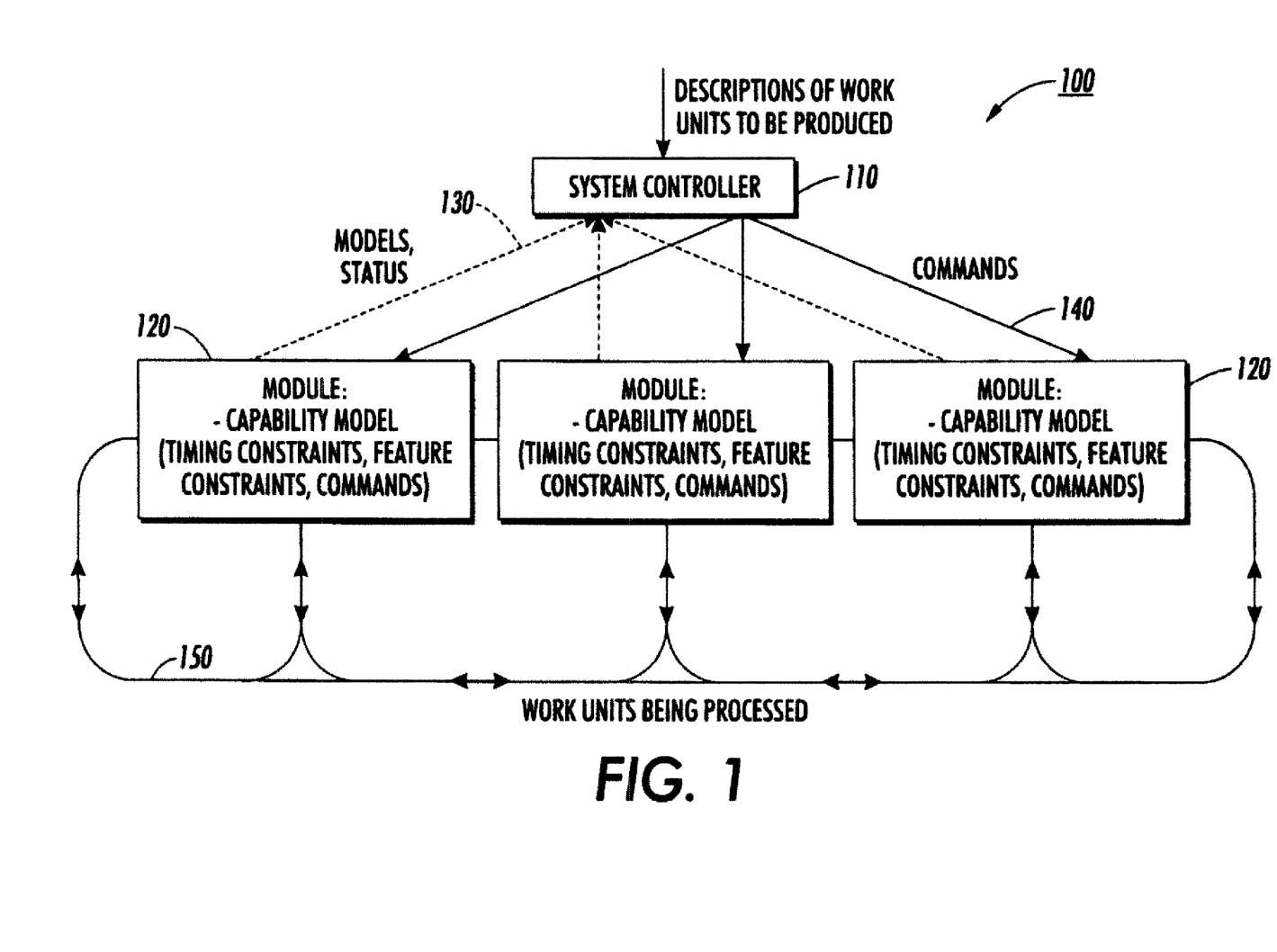
FIG. 1 is a schematic representation of an example embodiment of a modular production system utilizing modular self-synchronization.

Turning now to the drawings, wherein the purpose is for illustrating the embodiments of the system and method, and not for limiting the same, FIG. 1 illustrates a controller for planning and scheduling various jobs and maximizing productivity in conformance with one embodiment of the subject system. In a system 100, system controller 10 receives descriptions of work units to be produced from any known type of job input source. These descriptions correspond to descriptions of the desired output products or other goals to be achieved. They may specify attributes (or properties) of the products, values or ranges or general constraints for these attributes, and possibly constraints on the timing of the production (e.g., deadlines), but generally without specifying how the products are to be produced. Descriptions of work units are typically grouped into jobs, and are received incrementally.

Because system control, including planning and scheduling, as well as execution, happens incrementally, these operations all occur concurrently. Therefore, it may not always be possible or desirable to generate a plan and then execute it without modification. System controller 110 also receives, along paths 130, capability models and performance log information from each module 120 in the system. The capability models are descriptions of how the modules move and transform work units, generally together with information about the attributes and timing of the work units. Models may be sent to the system controller only once when the production system is started up, or the models may be updated regularly or when changes occur. Such changes in the modules (and therefore in the models) may, for example, be the reconfiguration of the modules, changes in timing values, and the unavailability of resources (and thus some capabilities). The capability models include, for example, timing constraints (e.g., the duration of execution of a capability, or the reservation of a resource), feature constraints (e.g., limits on the size of the work units being processed, transformation of the work units such as changing the orientation of a part or adding two parts together), and commands (e.g., the names or identifications of the operations corresponding to the capabilities, together with times and possibly other information). The timing and feature constraints describe when and how a capability can be applied to a work unit. The commands are the commands that are sent to the modules in order to start the corresponding operations.

Modules 120 may encompass many varying types of production systems, for example machine modules of a print engine, such as a feeder module, mark engine module, finisher module, or transport module. Alternatively, modules 120 may include the analysis modules of a biotech screening system, which may comprise a preparation module, heating module, mixing module, analysis module, or transport robot. Manufacturing line modules may include a machining module, assembling module, testing module, transport robot, or packaging module. A packaging line may include a bottle filling module or a labeling module. System controller 110 considers all possible system capabilities when searching for schedules for the desired work units.

The timing of actions (capabilities) selected by the planning and scheduling software depends on several factors, including the durations of actions and the interactions between the actions of different modules. The duration of an action is in turn determined by factors such as the mechanical limits of its components (e.g., motors, robots) as well as choices made in the software that controls these components. For example, a transport motor may be run at several different speeds within a given range; the chosen speed determines how fast a part is transported in that module. Since the timing of actions of one module in the system typically depends on the timing and duration of actions of other modules, the choices made in one module affect the overall productivity of the system. For example, if there is a loop with one module whose actions can only be executed at regular intervals, and if the action durations of all other modules in the loop are fixed independently, the overall loop time may be such that parts have to be delayed to arrive at the first module at the right interval.

Planning and scheduling some or all of the desired work units of one or more jobs results in a set of selected and scheduled capabilities. With these available, the system controller 110 sends the instruction commands corresponding to the scheduled capabilities to modules 120 along paths 140. Each of the modules then performs its task sequence for the completion of the specified job. As can be seen in path 150, which illustrates the path of the work units being processed, work may cycle repeatedly within a particular module 120 before moving to the next module in succession, or work may cycle repeatedly among several modules before passing to a third module. Although only three modules 120 are illustrated for the purposes herein, it will be understood that a system may include numerous modules, depending on the complexity of the job requirements. The modules may have various configurations within a system that is reconfigurable. Additionally there is also capability for operator feedback as to the work being scheduled on the modules and the state of the system at any point in time.

Figure 2:
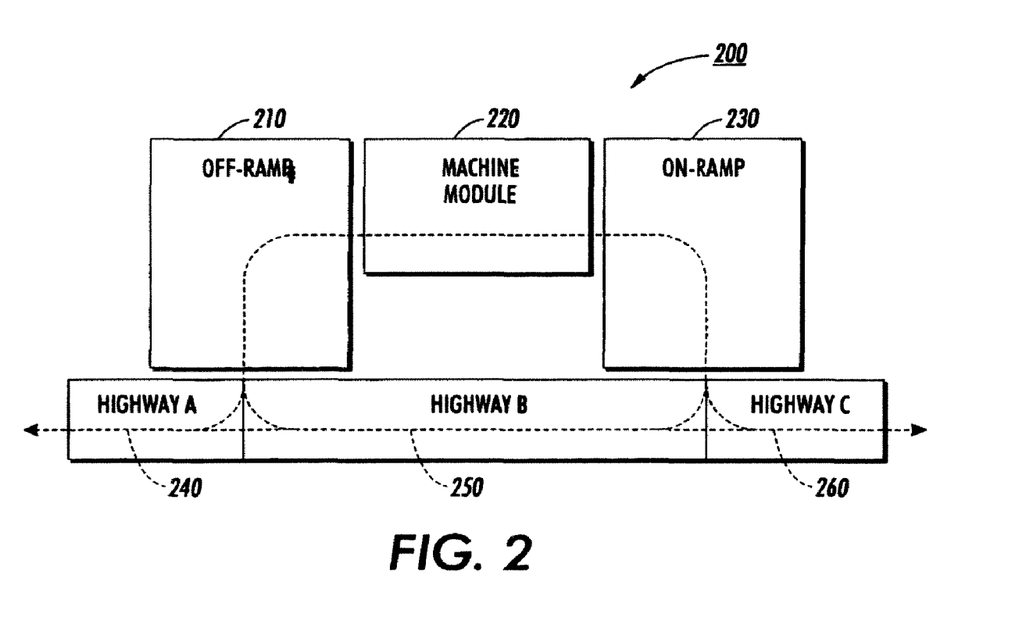
FIG. 2 is a schematic representation of one embodiment of a configuration loop for a modular production system having a single robotic module.

One example embodiment of a system configuration to which self-synchronization can be utilized is illustrated in FIG. 2. Such a system 200 consists of four primary components, at least one machine module or robot (for example a printer, labeling machine, sorter, packer, etc.), a highway on which items are transported (for example a paper path or an assembly line), and special moving components that interface the machine module to the highway. For the purposes of description, these moving components will be referred to as off-ramps (from highway to machine module) and on-ramps (from machine module to highway). The highway is typically used to transport items repeatedly to the machine module, or to bypass the machine module, with the highway usually moving more quickly than the machine module's processing capability. In this embodiment the transport highway consists of three segments forming a loop, with highway segment 240 transferring items from the left to a split to off-ramp 210. Highway segment 250 provides the capability to bypass machine module 220 by transporting items directly from highway segment 240 to highway segment 260 and extends from the split to off-ramp 210 to a merger from on-ramp 220. Highway segment 260 extends from the merger with on-ramp 220 to the right. Off-ramp 210 and on-ramp 230 may decelerate and accelerate the items from and to the highway segments, but may also perform other operations, such as orienting items. A particular configuration may have multiple machine modules and multiple highways connected together.

The various components may have various dimensions and move items at different speeds from their input locations to their output locations. Self-synchronization enables the system to choose these dimensions or times such that the machine modules are used at full capacity, that is, that they are never idle. For the purposes herein, this is considered a matter of adjusting the input-output times (or durations) of the components. Within the limits of the components, these can be changed by altering path lengths or changing processing and moving velocities (d=l/v for duration d, path length l, and velocity v). Because the function of machine modules is often fixed, and changing highway times often affects other components outside the immediate configuration of interest, adaptation typically occurs in the off-ramp or the on-ramp components, or both. However, the method described herein may be utilized for any component.

Figure 3:
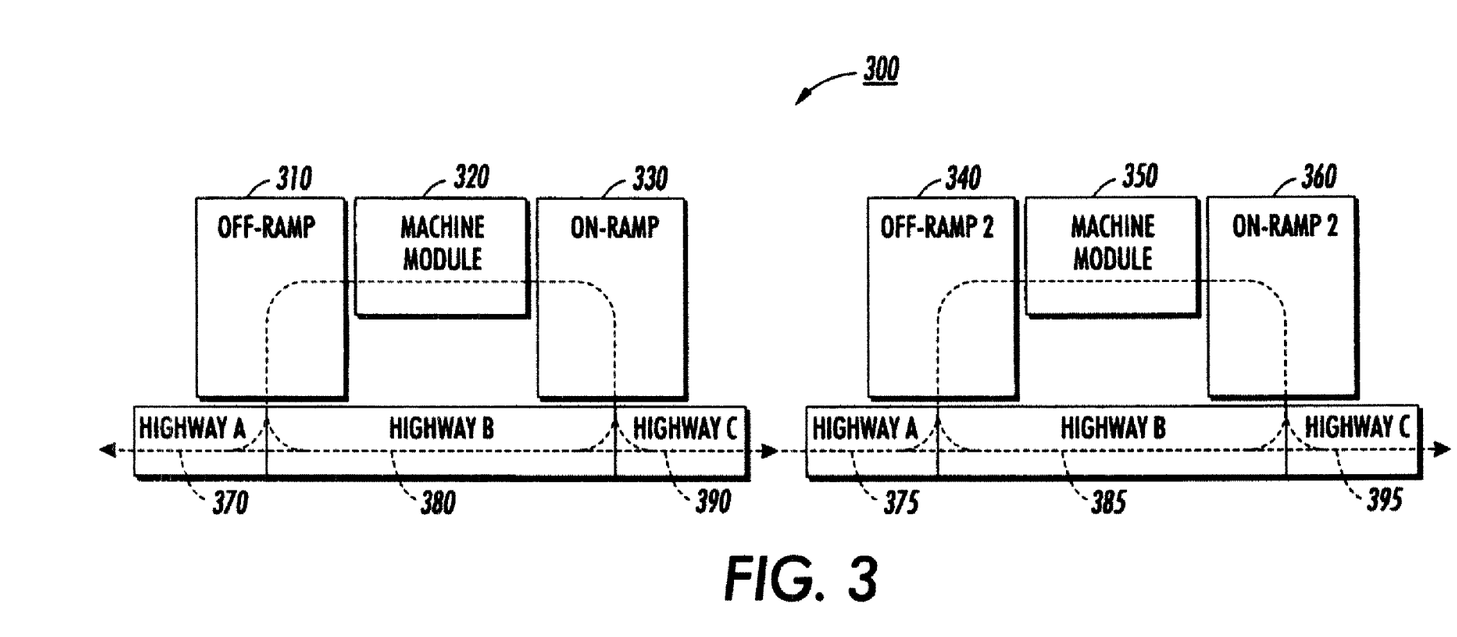
FIG. 3 is a schematic representation of one embodiment of a configuration loop for a modular production system having robotic modules configured serially and utilizing a shared highway.

An alternate loop configuration 300 is illustrated in FIG. 3, which shows a serial configuration of machine modules 320 and 350 sequentially located on a shared highway. In this configuration, each machine module system includes at least one machine module (for example a printer, labeling machine, sorter, packer, etc.), a highway on which items are transported (for example a paper path or an assembly line), and special moving components that interface the machine module to the highway. As was the case hereinabove with reference to FIG. 2, these moving components will be referred to as off-ramps (from highway to machine module) and on-ramps (from machine module to highway). The highway is typically used to transport items repeatedly to the machine module, or to bypass the machine module, with the highway usually moving more quickly than the machine module's processing capability.

In this embodiment the transport highway for each machine module consists of three segments forming a loop, with highway segment 370 transferring items from the left to a split to off-ramp 310. Highway segment 380 provides the capability to bypass machine module 320 by transporting items directly from highway segment 370 to highway segment 390 and extends from the split to off-ramp 310 to a merger from on-ramp 330. Highway segment 390 extends from the merger with on-ramp 330 to the right, where it connects to highway segment 370. In a similar fashion highway segment 375 extends to a split to off-ramp 340 and highway segment 385 provides the capability to bypass machine module 350 by transporting items directly from highway segment 375 to the merger with highway segment 395. Off-ramps 310 and 340 and on-ramps 330 and 360 may decelerate and accelerate the items from and to the highway segments, but may also perform other operations, such as orienting items.

Although only two machine modules are linked in this example configuration, it will be noted that a particular configuration may have multiple machine modules and multiple highways connected together serially. The various components of this example configuration may have various dimensions and move items at different speeds from their input locations to their output locations. Self-synchronization enables the system to choose these dimensions or operational durations such that the machine modules are used at full capacity, and items move seamlessly through the processing steps for each module and along the serially linked highway.

Figure 4:
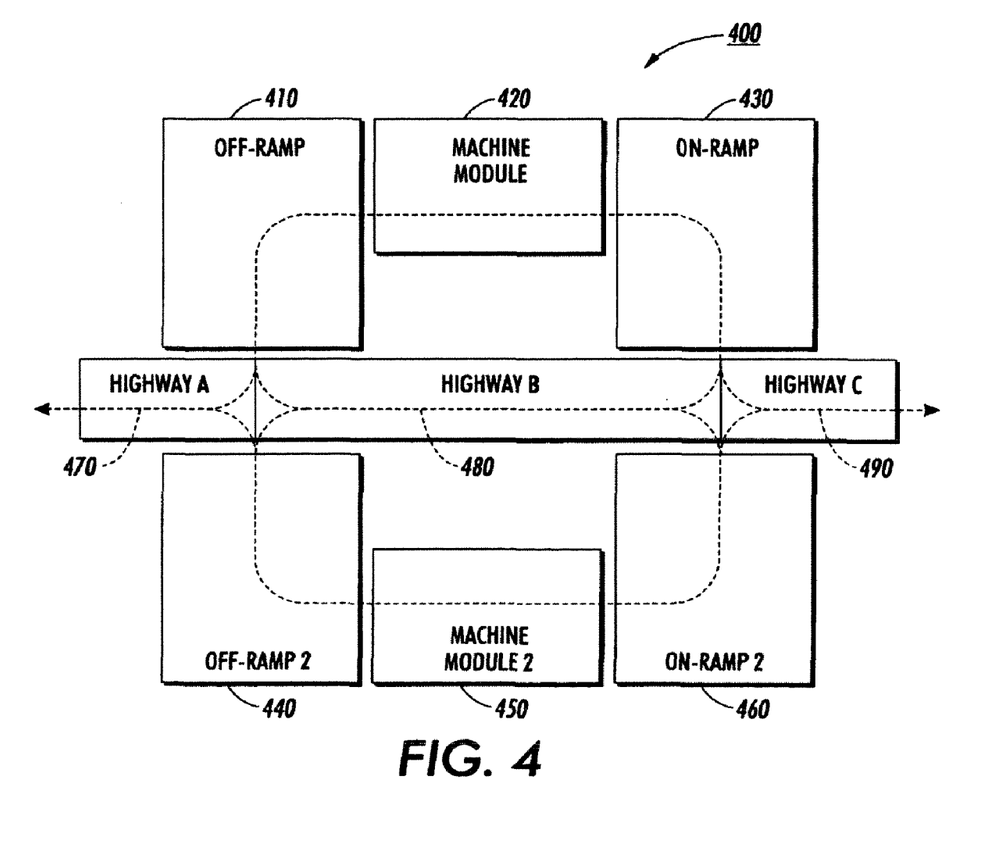
FIG. 4 is a schematic representation of one embodiment of a configuration loop for a modular production system having robotic modules configured in parallel and utilizing a shared highway.

Yet another example loop configuration 400 is illustrated in FIG. 4, which shows a parallel configuration of machine modules 420 and 450 located in parallel on a shared highway. In this configuration, each machine module system includes at least one machine module (for example a printer, labeling machine, sorter, packer, etc.), a highway on which items are transported (for example a paper path or an assembly line), and special moving components that interface the machine module to the highway. As was the case hereinabove with reference to FIG. 2, these moving components will be referred to as off-ramps (from highway to machine module) and on-ramps (from machine module to highway). The highway is typically used to transport items repeatedly to the machine module, or to bypass the machine module, with the highway usually, but not always, moving more quickly than the machine module's processing capability.

In this embodiment the transport highway for each machine module consists of three shared segments forming approximately parallel loops, with highway segment 470 transferring items from the left to splits leading to off-ramps 410 and 440. Highway segment 480 provides the capability to bypass either of both of machine modules 420 and 450 by transporting items directly from highway segment 470 to highway segment 490 and extends from the splits to off-ramps 410 and 440 to mergers from on-ramps 430 and 460. Highway segment 490 extends from the merger with on-ramps 430 and 460 to the right Off-ramps 410 and 440 and on-ramps 430 and 460 may decelerate and accelerate the items from and to the highway segments, but may also perform other operations, such as orienting items.

Although only two machine modules are linked in this example configuration, it will be noted that a particular configuration may have multiple machine modules connected on each side of the shared highway and parallel configurations may be connected together serially. The various components of this example configuration may have various dimensions and move items at different speeds from their input locations to their output locations. Self-synchronization enables the system to choose these dimensions or operational durations such that the machine modules are used at full capacity, and items move seamlessly through the processing steps for each module and along the shared highway.

One option for enabling the system to choose operational durations is to allow the planner/scheduler to decide at run time, every time a job or part of a job is to be scheduled, what the best behavior is in order to achieve optimal overall system behavior. Alternatively, it is often possible to fix module parameters for jobs of interest ahead of time (for example, after a configuration has been put together) such that the fixed module behaviors lead to optimal system behavior. A module behavior may be fixed, for example, by instantiating a time parameter to a constant. The planner/scheduler then doesn't need to find a parameter value at run time and instead uses this time with the guarantee that this will result in optimal behavior for the jobs of interest. This is often beneficial if configurations are complex and finding optimal times at run time would be intractable.

Figure 5:
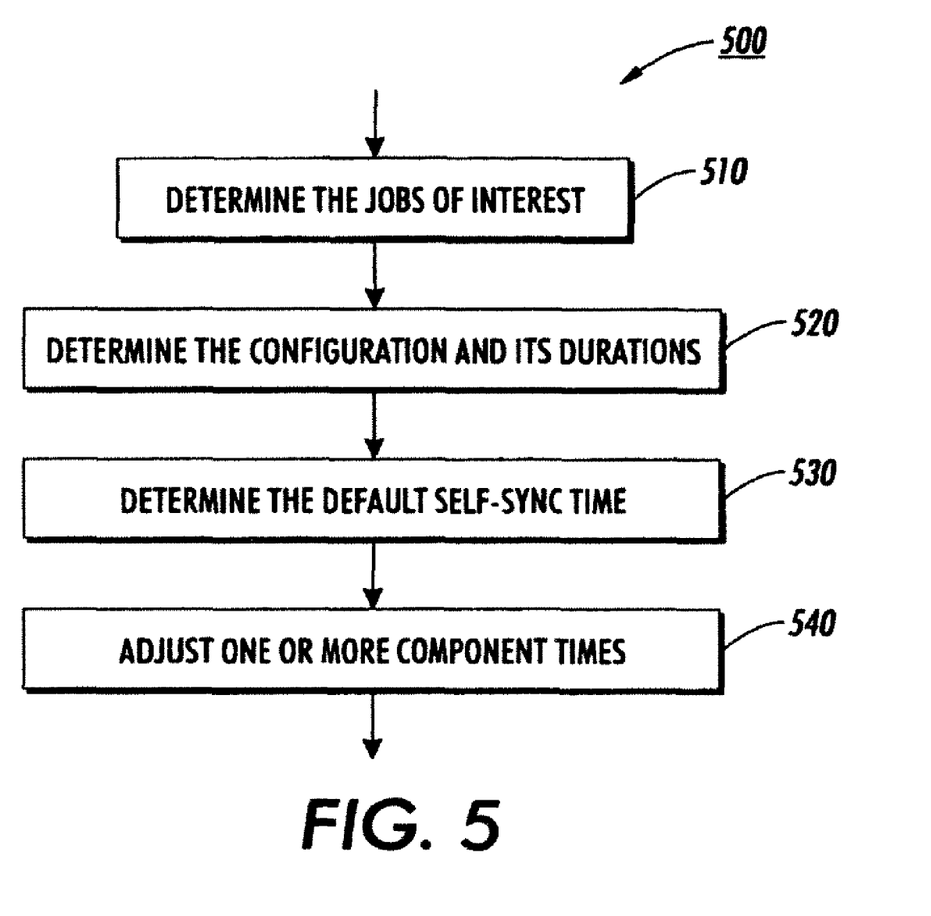
FIG. 5 is a flow chart detailing one embodiment of the ordering of operation to accomplish self-synchronization within the modular production system.

The method of self-synchronization, as shown in FIG. 5, is one approach to set certain time parameters to achieve optimal overall behavior. In method 500, the jobs of interest are defined at 510. For the purposes herein, it is assumed that jobs of interest consist of at least one pass through the configuration, including at least one machine module. Jobs of interest may be distinguished by different item specifications and different operations to be performed, for example, the jobs of interest may be simplex or duplex printing jobs for a single sheet size within a printing system. The configuration is assumed to be one of the three types of configurations described hereinabove with reference to FIGS. 2 through 4. The shared-highway configurations may have more than two machine modules, since the self-synchronization method applies for any number of connected machine modules.

Configuration durations are determined at 520. The durations are the specified operational times for an individual component, i.e., the time from when an item arrives at a component's input to when the item reaches the component's output location, which is also the input location for the next component. Duration times may vary with the jobs and items to be processed. Since a fixed type of job is assumed, it is also assumed that the duration times are constants for that type of job. For example, in a print system with loop configuration, the off-ramp may move and invert sheets, the printer (machine module) will print images, and the other components will simply move sheets. The default or minimum duration for each of these tasks can be determined (for example, printing an image depends on the speed of the printer and the size of the image and inverting a sheet depends on the size of the sheet). In this example, the off-ramp may also be able to hold sheets in the inverter, i.e., it can adjust the duration of its operation if desired.

At 530 the default self-synchronization time is determined and is then adjusted at 540 such that the loop or other synchronization time is a multiple of the machine module's work period. For example, for a simple loop, it is the time to complete the loop using the default (or minimum) duration times of each component for a specific task. This time is then adjusted by increasing one or more components' duration times above the minimum. For loop configurations, the default self-synchronization time $t_{ds}$ is the sum of the default durations $d_i$ of components i in the loop:

$$t_{ds} = \sum_{i \in Components} d_i$$

$$= d_{off\text{-}ramp} + d_{machinemodule} + d_{on\text{-}ramp} + d_{highway\text{-}B,loop},$$

where $d_{highwayX,loop}$ is the duration of highway X along the "curved part" of the path. As noted hereinabove, the default time may be a given, fixed time for some components (i.e., the machine module), but it is usually the minimum time for those components that can be adjusted. Thus the loop is synchronized with itself.

For serial, shared-highway configurations, the default self-synchronization time $t_{ds}$ is the difference between the default straight highway path time and the default time for by-passing the machine module:

$$t_{ds} = |d_{highway} - d_{highwayA,loop} - d_{off\text{-}ramp} - d_{machinemodule} - d_{on\text{-}ramp} - d_{highwayC,loop}|,$$

where $$d_{highway} = d_{highwayA,straight} - d_{highwayB,straight} - d_{highwayC,straight}$$

and $d_{highwayX,straight}$ is the duration of highway X along the "straight part" of the path. This synchronizes the machine module path with the highway bypass.

For parallel, shared-highway configurations, it is necessary to simultaneously synchronize the loops with themselves and with each other:

$$t_{ds.1} = d_{off\text{-}ramp.1} + d_{machinemodule.1} + d_{highwayB,loop} + d_{on\text{-}ramp.1}$$

$$t_{ds.2} = d_{off\text{-}ramp.2} + d_{machinemodule.2} + d_{highwayB,loop} + d_{on\text{-}ramp.2}$$

$$t_{ds.1} = |d_{off\text{-}ramp.2} + d_{machinemodule.2} + d_{on\text{-}ramp.2} - d_{off\text{-}ramp.1} - d_{machinemodule.1} - d_{on\text{-}ramp.1}|$$

$$t_{ds.2} = |d_{off\text{-}ramp.1} + d_{machinemodule.1} + d_{on\text{-}ramp.1} - d_{off\text{-}ramp.2} - d_{machinemodule.2} - d_{on\text{-}ramp.2}|$$

If machine module and off-ramp times are identical for highway sections 1 and 2, then the two default self-synchronization times are identical and can be determined as for simple loop configurations. If items are never looped back to the same machine module, then the configuration behaves like a serial configuration and can be handled accordingly. If durations in the two sections are different and all routes are allowed, different self-synchronization times are chosen depending on whether an item loops back to the same highway section or into another highway section. Also, when moving items from one highway section to another highway section, the duration times are to be synchronized such that each highway section feeds the other at a multiple of the other machine module's work period.

At 540 the component duration times are adjusted to optimize the self-synchronization time. For a default self-synchronization time, an adaptation time tad is determined as $$t_{ad} = k p_{machinemodule} - t_{ds},$$

where $p_{machinemodule}$ is the machine module's operation period length, and k is $$\left\lceil \frac{t_{ds}}{p_{machinmodule}} \right\rceil$$

(where ⌈x⌉ is the smallest integral value greater than or equal to x). The operation period is given by the rate at which the machine module processes the items. For example, in a printer the operation period would be the pitch length of images on the photo-receptor belt, i.e., the time from the printing of one image to the printing of the next image.

The adaptation time is then added to the duration of one of the components, e.g., the on-ramp duration, by decreasing the velocity, adding wait time, or increasing the path length (if possible). The adaptation time can also be split among multiple components, for example both the off-ramp and the on-ramp of a machine module system. This synchronizes multiple machine modules and the transport components between them, providing that highways are always able to feed items without delays to and between the machine modules.

While the present discussion has been illustrated and described with reference to specific embodiments, further modification and improvements will occur to those skilled in the art. For example, one or more of the components, in particular the moving components, could be left out of a configuration in certain cases. In some configurations, the machine module or the highway may have the functionality of the on-ramp or off-ramp built in, e.g., they would be able to decelerate and accelerate work units. Additionally, for simpler configurations, no scheduler may be needed because of self-synchronization. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

What is claimed:

1. A method of self-synchronization of a modular production system, including:
   selecting at least one work unit path through the modular production system;
   identifying a configuration of components associated with each selected work unit path, wherein each configuration of components includes at least one transport highway, at least one machine module, and at least two moving components associated with each machine module, each transport highway including a plurality of highway segments arranged to transfer work units along the corresponding selected work unit path;
   determining a component duration time for each machine module and moving component associated with each selected work unit path;
   determining a segment duration time for each highway segment associated with each selected work unit path;
   determining a default self-synchronization time for each selected work unit path, wherein each default self-synchronization time includes a sum of component and segment duration times associated with the corresponding selected work unit path; and
   determining an adjusted self-synchronization time for each default self-synchronization time by increasing at least one component or segment duration time associated with the corresponding selected work unit path, wherein each adjusted self-synchronization time is an integer multiple of the component duration time for a select machine module associated with the corresponding selected work unit path.

2. The method of claim 1 wherein the configuration of components for a first selected work unit path includes a first transport highway, a first machine module, and a first off-ramp and a first on-ramp associated with the first machine module, the first transport highway including a first plurality of highway segments arranged to enable a work unit to flow through the first off-ramp, first machine module, and first on-ramp.

3. The method of claim 2 wherein determining the default self-synchronization time for the first selected work unit path includes summing component and segment duration times along the first selected work unit path when the work unit flows through the first machine module to obtain a flow-through sum.

4. The method of claim 3 wherein the first plurality of highway segments are arranged to enable the work unit to bypass the first off-ramp, first machine module, and first on-ramp.

5. The method of claim 4 wherein determining the default self-synchronization time for the first selected work unit path includes summing the segment duration times along the first selected work unit path when the work unit bypasses the first machine module to obtain a bypass sum and determining an absolute difference between the bypass sum and the flow-through sum.

6. The method of claim 2 wherein the first plurality of highway segments are arranged to enable the work unit to flow through the first off-ramp, first machine module, and first on-ramp for at least one additional cycle.

7. The method of claim 2 wherein the configuration of components for the first selected work unit path includes a second transport highway, a second machine module associated with the second transport highway, a second off-ramp and a second on-ramp associated with the second machine module, the second transport highway including a second plurality of highway segments arranged to enable the work unit to flow through the second machine module.

8. The method of claim 7 wherein determining the default self-synchronization time for the first selected work unit path includes summing component and segment duration times along the first selected work unit path when the work unit flows through the second machine module to obtain a flow-through sum.

9. The method of claim 8 wherein the second plurality of highway segments are arranged to enable the work unit to bypass the second off-ramp, second machine module, and second on-ramp.

10. The method of claim 9 wherein determining the default self-synchronization time for the first selected work unit path includes summing the segment duration times along the first selected work unit path when the work unit bypasses the second machine module to obtain a bypass sum and determining an absolute difference between the bypass sum and the flow-through sum.

11. The method of claim 7 wherein the second plurality of highway segments are arranged to enable the work unit to flow through the second off-ramp, second machine module, and second on-ramp for at least one additional cycle.

12. The method of claim 7 wherein the first and second plurality of highway segments are arranged to enable the work unit to serially flow through the first off-ramp, first machine module, first on-ramp, second off-ramp, second machine module, and second on-ramp for at least one additional cycle.

13. The method of claim 1 wherein the configuration of components for a first work unit path includes a first transport highway, a first machine module associated with the first transport highway, first off-ramp and first on-ramp associated with the first machine module, a second transport highway, a second machine module associated with the second transport highway, second off-ramp and second on-ramp associated with the second machine module, the first and second transport highways including a plurality of highway segments arranged to enable a work unit to flow through either the first or second machine module.

14. The method of claim 13 wherein determining the default self-synchronization time for the first selected work unit path includes summing the component and segment duration times along the first selected work unit path when the work unit flows through the first machine module to obtain a first flow-through sum, summing the component and segment duration times along the first selected work unit path when the work unit flows through the second machine module to obtain a second flow-through sum, and determining an absolute difference between the first flow-through sum and the second flow-through sum.

15. The method of claim 13 wherein the plurality of highway segments are arranged to enable the work unit to bypass both first and second machine modules.

16. The method of claim 13 wherein the plurality of highway segments are arranged to enable the work unit to flow through either the first or second machine module for at least one additional cycle.

17. The method of claim 1 wherein determining each adjusted self-synchronization time includes determining an adaptation time for the corresponding default self-synchronization time and allocating the adaptation time to the at least one component or segment duration time associated with the corresponding selected work unit path.

18. The method of claim 17 wherein determining the adaptation time includes determining a difference between i) a product of the multiple of the component duration time for the select machine module and a work unit rate for the select machine module and ii) the default self-synchronization time for the corresponding selected work unit path.

19. A method for self-synchronization of a modular production system, comprising:
    identifying a plurality of components arranged in a configuration providing a plurality of work unit paths for processing and transporting work units through the modular production system;
    selecting a work unit path through the modular production system by identifying a configuration of components associated with the work unit path, wherein the configuration of components includes at least one transport highway, at least one machine module, and at least two moving components associated with each machine module, each transport highway including a plurality of highway segments arranged to transfer work units along the work unit path;
    determining a component duration time for each machine module, moving component, and highway segment along the work unit path, wherein the component duration time comprises the elapsed time from receipt of a work unit at the component's input location to arrival of the work unit at the component's output location;
    determining a default self-synchronization time for the work unit path, wherein the default self-synchronization time comprises a sum of component duration times associated with the work unit path; and
    optimizing the default self-synchronization time to form an adjusted self-synchronization time for the work unit path by adjusting at least one component duration time associated with the work unit path, wherein the adjusted self-synchronization time comprises a multiple of the component duration time for a select machine module associated with the work unit path.

20. A system for self-synchronization of a modular production system, comprising:
    means for identifying a plurality of components arranged in a configuration providing a plurality of work unit paths for processing and transporting work units through the modular production system;
    means for selecting a work unit path through the modular production system by identifying a configuration of components associated with the work unit path, wherein the configuration of components includes at least one transport highway, at least one machine module, and at least two moving components associated with each machine module, each transport highway including a plurality of highway segments arranged to transfer work units along the work unit path;
    means for determining a component duration time for each machine module, moving component, and highway segment along the work unit path, wherein the component duration time comprises the elapsed time from receipt of a work unit at the component's input location to arrival of the work unit at the component's output location;
    means for determining a default self-synchronization time for the work unit path, wherein the default self-synchronization time comprises a sum of component duration times associated with the work unit path; and
    means for optimizing the default self-synchronization time to form an adjusted self-synchronization time for the work unit path by adjusting at least one component duration time associated with the work unit path, wherein the adjusted self-synchronization time comprises a multiple of the component duration time for a select machine module associated with the work unit path.

* * * * *